T. S. McKINNIE.

DEVICE FOR BRIDGING JOINTS OF RAILWAY RAILS.

No. 11,642. Reissued Dec. 21, 1897.

Witnesses
Geo. E. Fuch.
B. C. Seitz

Inventor
Thomas S. McKinnie,
by Pattison & Nesbit,
Attorney's

THE NORRIS PETERS CO., PHOTO-LITHO., WASHINGTON, D. C.

UNITED STATES PATENT OFFICE.

THOMAS S. McKINNIE, OF CLEVELAND, OHIO, ASSIGNOR TO THE McKINNIE RAIL BRIDGE COMPANY, OF SAME PLACE.

DEVICE FOR BRIDGING JOINTS OF RAILWAY-RAILS.

SPECIFICATION forming part of Reissued Letters Patent No. 11,642, dated December 21, 1897.

Original No. 561,602, dated June 9, 1896. Application for reissue filed November 1, 1897. Serial No. 657,099.

*To all whom it may concern:*

Be it known that I, THOMAS S. McKINNIE, a citizen of the United States, residing at Cleveland, in the county of Cuyahoga and State of Ohio, have invented certain new and useful Improvements in Devices to Bridge the Joints of Railway-Rails; and I do declare that the following is a full, clear, and exact description of the invention, which will enable others skilled in the art to which it appertains to make and use the same.

My invention has reference to devices for bridging the joints of railway-rails, and has for its object the production of a bridge of an improved form, whereby it is very effective for the purpose of preventing "hammering" or "pounding" of the ends of railroad-rails and is particularly capable of being conveniently, easily, and cheaply applied to the joints of rails already laid and without removing or disturbing the rails or interfering with traffic thereon, as well as to rails which may have their ends prepared for its reception before they are laid.

Figure 1:
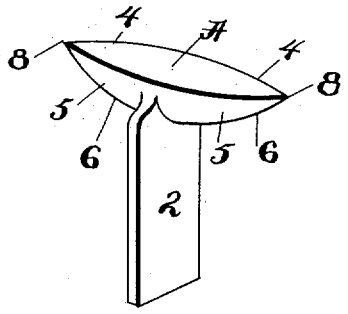
Figure 2:
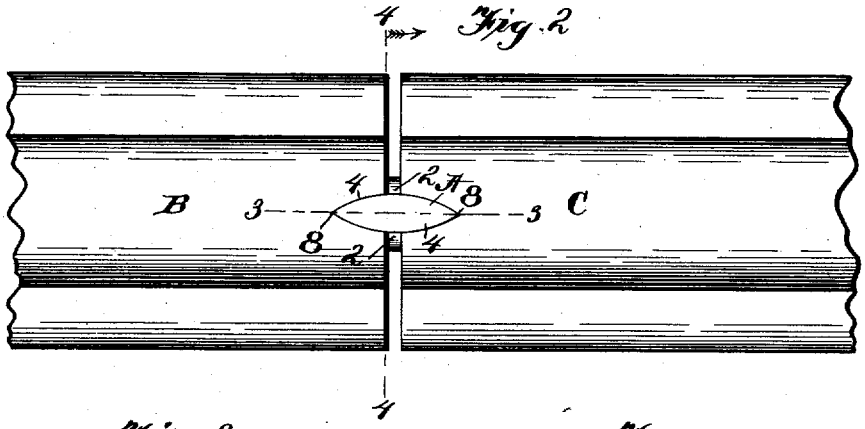
Figure 3:
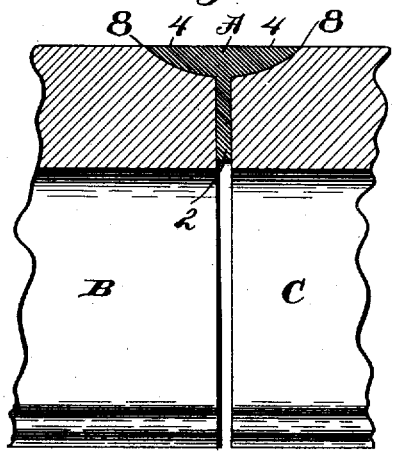
Figure 4:
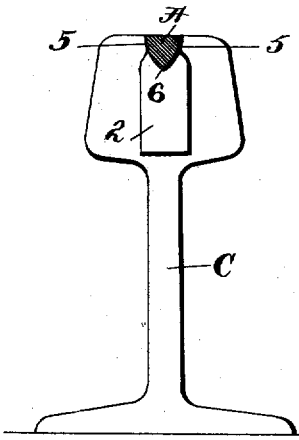

Having reference to the drawings, Figure 1 is a perspective view of my improved bridging device. Fig. 2 is a plan view of end sections of railway-rails in working relation with my improved bridge in position as used. Fig. 3 is a longitudinal section on line 3 3, Fig. 2. Fig. 4 is an elevation on line 4 4, Fig. 2, looking to the right and showing the bridge in section.

The outline and appearance of my improved bridging device when a stem is used is substantially T shape, as fully shown in Fig. 1, having a stem or standard 2 and arms 4 of uniform outline at its top. The stem 2 is flat and thin and adapted to enter and remain between the ends of the rails and may, if desired, be made of varying thicknesses to correspond with the varying spaces between the ends of the rails.

The tops of the arms 4 are flat and when the bridge is in position are flush with the top surfaces of the rails B and C, in the ends of which they are embedded, as illustrated in Figs. 2 and 3, and the tops of the arms are approximately V-shaped in plan view, forming together approximately a diamond shape, which, together with the tapering sides and rounding bottom, forms a boat-shaped device. The sides 5 of said arms converge inwardly and downwardly from their top surfaces to the central bottom meeting-point 6, and the inward taper is preferably uniform on both sides to form a symmetrical finish throughout and exactly the same at both ends. This makes the said arms substantially V shape in cross-section at any and all points; but I preferably slightly round the sides, as shown, which gives the arms more strength and serves altogether a better purpose than plain straight sides would.

As clearly shown, the bottoms of the arms are curved from their tops at the points 8 downward toward the stem, whereby the meeting ends of rails already laid can be prepared by a rotating cutter, such as a milling-tool having a circle corresponding with said curve. This enables the bridge to be quickly, conveniently, and cheaply applied to the ends of rails already laid and without removing them from their positions, and these advantages are present irrespective of any holding means.

I have here shown the device with T-rails, but it can as well be used with rails of different forms. If there be danger of the device jumping out of place, it can be provided with a suitable catch or lock, but I have not been troubled on this account. Steel or any durable metal may be used for this purpose.

Although the bridge is so constructed that the ends of the rails can be notched by a rotating tool, as stated, yet the ends of the rails can be notched by other instruments to accommodate the bridge.

The cross-sectional V shape is found to be of advantage in a device of this character, combined with the curved bottom, in furnishing the sharp points shown, and is also of advantage, in connection with the curved bottom, in enabling a correspondingly-shaped rotating tool to be used, which will more rapidly cut the rails, and the form requires the removal of less metal.

Having thus described my invention, what I claim, and desire to secure by Letters Patent, is—

1. A rail-bridging device having a double-pointed flat top, tapering sides, and a longitudinally-curved bottom, substantially as described.

2. A rail-bridging device having a double-pointed flat top, an intermediately-depending stem, sides tapering from the top surface downward and inward to a common longitudinal line, and a longitudinally-curved bottom, the curve terminating at the apexes of the pointed top, substantially as described.

3. A rail-bridging device having a flat elongated top, and a longitudinally-curved bottom, the curve beginning substantially at the upper edge or top of the ends and extending downward and inward for the purpose described.

4. A rail-bridging device comprising a flat double-pointed top, substantially V-shaped in cross-section, the bottom forming the segment of a longitudinal circle for the purpose described, combined with the rails having registering notches correspondingly shaped in cross-section and longitudinally, substantially as described.

5. A bridging device for rail-joints having a central stem and opposite arms substantially V-shaped in cross-section and flat over its top, in combination with the rails having notches in their ends corresponding to the said arms, whereby when the device is in working position the top surface thereof is made flush with the top of the rails, substantially as described.

6. A rail-bridging device consisting of a double-pointed flat top, having a longitudinally-curved bottom forming the segment of a circle, substantially as described.

Witness my hand to the foregoing specification this 19th day of October, 1897.

THOMAS S. McKINNIE.

Witnesses:
JAS. SCHAUERKER,
T. J. LALLY.